United States Patent [19]

Saadeh et al.

[11] 4,200,150
[45] Apr. 29, 1980

[54] METHODS AND HYDRAULICALLY EXPANDABLE SELF-CLEANING SAND SCREENS

[75] Inventors: Fuad T. Saadeh, Bellaire; Marc F. Fontaine, Houston, both of Tex.

[73] Assignee: Texaco Inc., White Plains, N.Y.

[21] Appl. No.: 952,747

[22] Filed: Oct. 19, 1978

[51] Int. Cl.² .......................................... E21B 43/08
[52] U.S. Cl. ........................... 166/231; 29/163.5 CW; 166/311; 210/106
[58] Field of Search ............... 166/205, 231, 232, 233, 166/311, 312; 175/314; 210/106, 108; 29/163.5 CW

[56] References Cited

U.S. PATENT DOCUMENTS

| | | | |
|---|---|---|---|
| 880,635 | 3/1908 | Decker | 166/232 |
| 1,223,969 | 4/1917 | Hanson | 166/231 |
| 1,638,731 | 8/1927 | Hanson | 166/233 |
| 2,280,054 | 4/1942 | Beck | 166/233 |
| 2,729,294 | 1/1956 | Adams | 166/231 |
| 2,744,579 | 5/1956 | Gerhardt | 175/314 X |
| 3,754,651 | 8/1973 | Lannoch | 210/106 |
| 3,901,320 | 8/1975 | Calderon et al. | 166/315 X |
| 3,937,281 | 2/1976 | Harnsberger | 166/233 |

Primary Examiner—Stephen J. Novosad
Assistant Examiner—George A. Suchfield
Attorney, Agent, or Firm—Carl G. Ries; Robert A. Kulason; Theron H. Nichols

[57] ABSTRACT

A method for cleaning a helical spring screen deep in a well while filtering liquid comprises (1) injecting a high pressure hydraulic surge pulse into the spring screen for expanding the coils, (2) forcing high pressure liquid between the coils of the helical spring screen simultaneously with expanding of the coils for washing the sand from between the coils, and (3) forcing the coils together following their expansion by expanding action of a second spring for crushing and dislodging any sand therebetween the coils for removal upon subsequent spreading of the coils. A second method is disclosed likewise. Methods for forming a self-cleaning helical spring screen and two modifications of a helical spring screen are disclosed herein for being cleaned for a multiplicity of times without having to shut the well in for workover, thus saving workover costs and lost production.

14 Claims, 4 Drawing Figures

METHODS AND HYDRAULICALLY EXPANDABLE SELF-CLEANING SAND SCREENS

BACKGROUND OF THE INVENTION

Certain hydrocarbon-bearing formations, especially those found at shallow depth, consist of semi- and unconsolidated sands that present problems during production. One such problem is movement of sand particles with produced fluids. This results in clogged bottomhole screens and reduced production, necessitating periodic cleaning of the well and screen or replacement of the latter. Present practice requires the use of workover rig equipment, opening the well, insertion of tools operated from the surface and mechanically carrying out the cleaning operation.

OBJECTS OF THE INVENTION

Accordingly, a principal object of this invention is to provide at least two methods for cleaning a helical spring screen by spreading the coils apart and simultaneously washing the foreign material from between the coils with high pressure liquid in the screen.

Another principal object of this invention is to provide at least two methods for forming or assembling a helical spring screen.

A still further principal object of this invention is to provide at least two hydraulically operated expandable self-cleaning sand screens that may be cleaned for a multiplicity of times before being brought to the surface.

A further object of this invention is to provide at least two methods for cleaning a helical spring screen, at least two methods for assembling a helical spring screen, and a few hydraulically operated self-cleaning helical spring screens that are easy to operate, are of simple configuration, are economical to build and assemble, and are of greater efficiency for the filtering or screening of sand from produced oil.

Other objects and various advantages of the disclosed self-cleaning helical spring screens and methods will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWING

The drawing diagrammatically illustrates by way of example, not by way of limitation, one form of the invention wherein like reference numerals designate corresponding parts in the several views in which.

Figure 1:
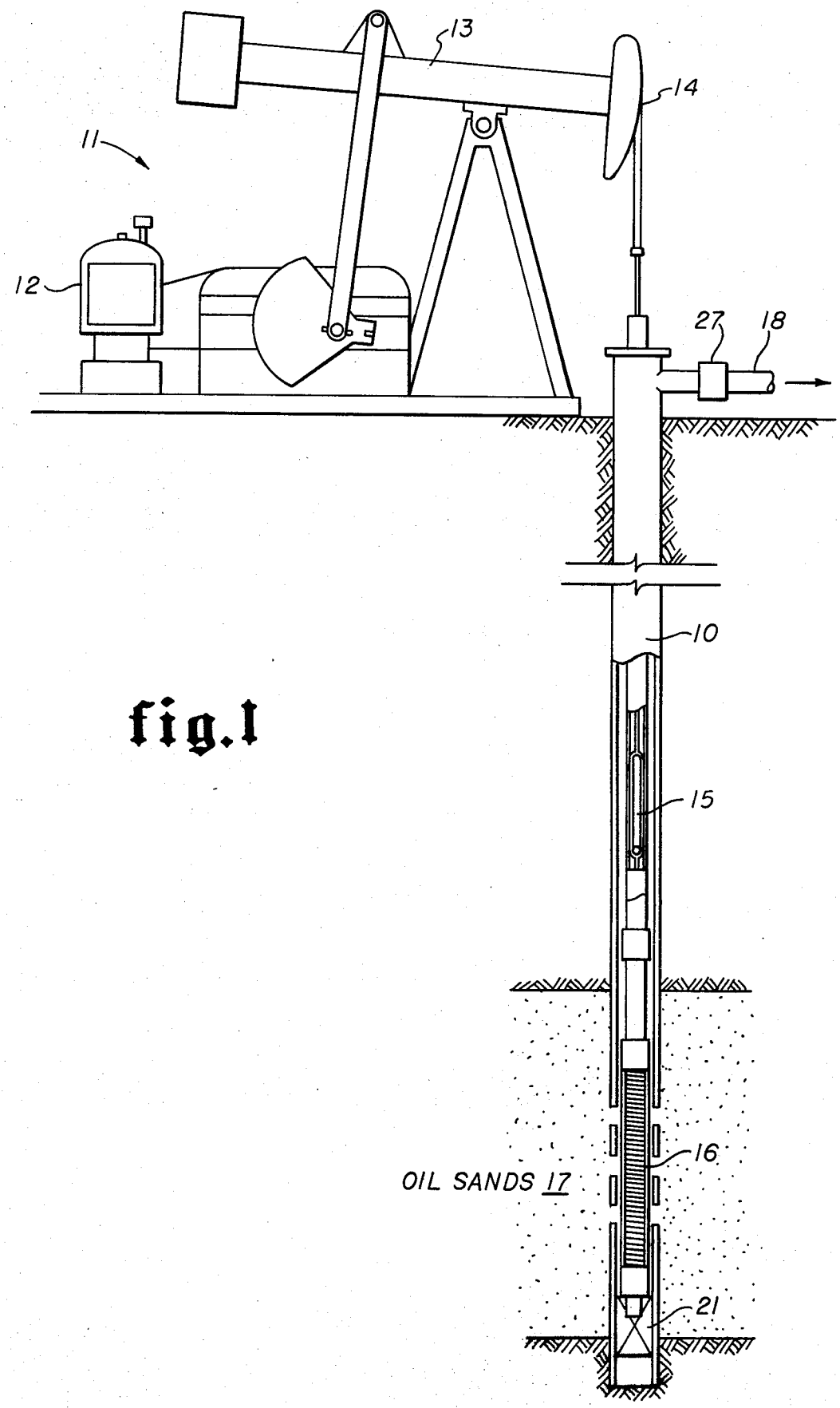
FIG. 1 is a schematic diagrammatic vertical sectional view with parts in section of the new sand screen as mounted in a typical oil well.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE INVENTIONS

This patent includes three inventions, two methods for cleaning a helical spring sand screen, two mechanisms for practicing the above methods comprising two modifications of a hydraulically operated self-cleaning helical spring sand screen, and two methods for assembling a self-cleaning helical spring sand screen.

METHODS FOR CLEANING A HELICAL SPRING SCREEN

Primarily, the method disclosed herein for cleaning a sand filter or screen (16 or 16a) comprising a flexible screen formed of rectangular spring wire coiled into a helical spring screen (19) inside an open housing (24) positioned deep in a petroliferous unconsolidated sand stratum or an oil well, for example, having a production tube (22) extending into the screen comprises the steps of, (1) injecting a high pressure hydraulic surge pulse from the production tube (22) into the helical spring screen (19) for expanding the coils of the helical spring screen, and (2) forcing high pressure oil between the coils of the helical spring screen simultaneously with expanding of the coils for washing the sand from between the coils.

Another method for cleaning a helical spring screen having a production tube extending into the screen for producing sand-free liquid comprises the steps of, (1) expanding the coils of the helical spring screen (19) by generating a high pressure hydraulic pulse in the helical spring screen, and (2) washing the coils of the helical spring screen simultaneously with step (1) above by forcing high pressure liquid between the coils from the high pressure hydraulic surge pulse for washing out the sand from between the coils.

A third method step which may be added to either of the above methods for additional cleaning comprises, (3) forcing the coils together following their expansion and attenuation of the hydraulic pulse by expanding action of a second spring (26 or 26a) that was compressed by the first method step, for crushing the sand therebetween the coils for removal upon subsequent spreading of the coils.

Two more specific and different methods are formed by adding two different third steps to the above generic method:

(3) Moving a piston (25, FIG. 2) slideable on the production tube (22) and connected only to one end of the helical spring screen (19) with the high pressure hydraulic pulse to expand the coils of the helical spring screen for washing the sand from between the coils thereof with the high pressure liquid.

The third step for the other method for a particularly long filter comprises:

(3) Contracting a plurality of spaced apart coils of the helical spring screen with lifter bar tabs (29a–29d, FIG. 3) for spreading apart all coils by substantially the same distance for each being cleaned equally by the high pressure liquid.

METHOD FOR ASSEMBLING A HELICAL SPRING SCREEN

The above described helical spring screen may be assembled by various methods. However, the preferred method for assembling the screen assembly (16 or 16a) for use on a production tube (22) for producing sand-free liquid comprises the following steps, (1) forming an open housing (24) with a piston (25) and cylinder (23) on one end and a base (20) on the other end spaced a predetermined distance from the piston when in a neutral position, and (2) securing the opposite ends of a helical spring screen (19) of a predetermined length to the piston and the housing base whereby upon generation of a hydraulic pulse in the helical spring screen, the coils of the helical spring screen are expanded and separated for cleaning thereof.

A more detailed method for forming or assembling a helical spring screen may comprise the following steps, (1) forming a closed ended cylinder (23) with an opening in the closed end for the production tube (22) to extend through, (2) slideably mounting a piston (25) in the cylinder, (3) forming an opening in the piston for its sliding movement around the production tube, (4) fixedly securing a base (20) of a housing (24) at a predetermined fixed distance from a neutral position of the piston, and (5) fixedly securing the opposite ends of a helical spring screen of a predetermined length to the base and piston respectivley, whereby upon generation of a hydraulic surge pulse from the production tube into the helical spring screen, the helical spring screen is expanded and the coils thereof washed clean.

In greater detail, the second method step may comprise further, (1) mounting a short spring (26) between the piston and the cylinder closed end whereby upon expansion of the helical spring screen, the piston is moved due to the surge pulse to compress the short spring so that upon attenuation of the surge pulse, the expanding short spring collapses the helical spring screen to crush the sand between the coils thereof for removal upon subsequent spreading of the coils.

For more details, the fourth method step may include further, (1) Fixedly securing a plurality of rigid bars (24) around the helical spring screen (19) between the cylinder and the base of the assembly for maintaining the assembly base at a predetermined fixed distance from the piston.

More details for forming one modification (FIG. 2) in the last method step comprise, (1) fixedly securing one end of the helical spring screen (19) to the cylinder base (20), and (2) fixedly securing the other end of the helical spring screen (19) to the piston (25) for pulling on and expanding the helical spring screen upon occurrence of a surge pulse, this connection being the sole connection for pulling and expanding the helical spring screen.

Details of a method for forming a second particularly long modification (FIG. 3) of the assembly are set forth by adding the last steps, (1) fixedly attaching one end of a lifter bar (28a) to the piston (25a), (2) fixedly attaching equally spaced apart tabs (29a-29d) on the lifter bar, and (3) fixedly attaching equally spaced apart lugs (30a-30d) on the helical spring screen coils (19a) for being contacted by the corresponding tabs for evenly expanding the helical spring screen along its full length from the assembly base upon occurrence of the surge pulse for equal distribution of spacing between the coils of a particularly elongated helical spring screen.

THE PREFERRED EMBODIMENTS FOR PRACTICING THE INVENTION

The above methods for cleaning a helical spring sand filter may be performed by other mechanisms than that disclosed in the FIGURES. The mechanism disclosed herein may be operated by or made by other methods than those disclosed, as by hand. However, the preferred assemblies for performing the method are disclosed in FIGS. 2, 3, and 4.

ARTICLES FOR PERFORMING THE METHODS

FIG. 1 is a schematic diagrammatic view of a typical producing oil well 10 having pumping equipment 11 comprising motor means 12 for actuating walking beam 13 with horse head 14 for operating pump 15 in the well. A crude oil pump is utilized after free flow has ceased for raising the oil that has passed through the filter 16 from the petroliferous unconsolidated sand 17 up to the surface to exit from discharge pipe 18. Except for the filter 16, all of the above parts may be conventional elements.

Figure 2:
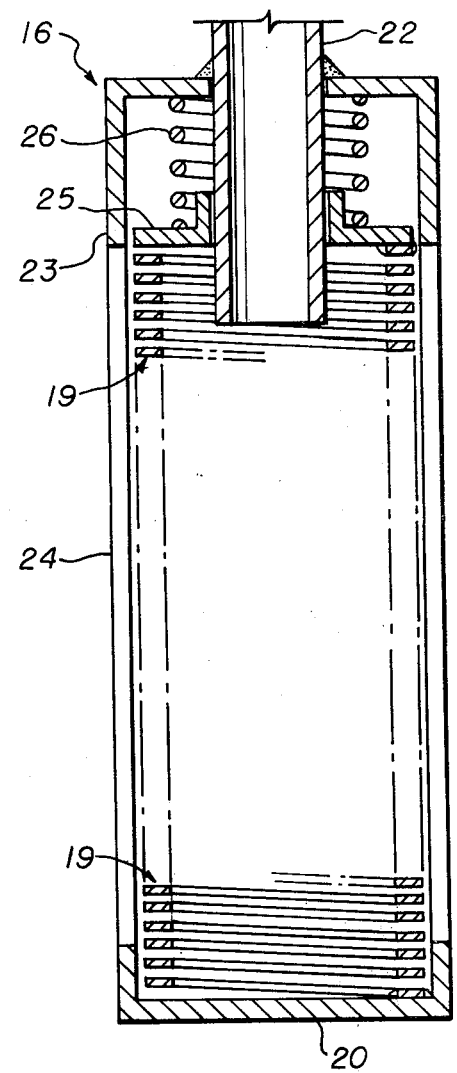
FIG. 2 is a schematic longitudinal sectional view of one modification of the new sand screen.

FIG. 2 illustrates a schematic enlarged sectional view of the preferred modification of the new self-cleaning helical spring filter 16a for performing the above-described methods.

EMBODIMENT OF FIG. 2

Figure 3:
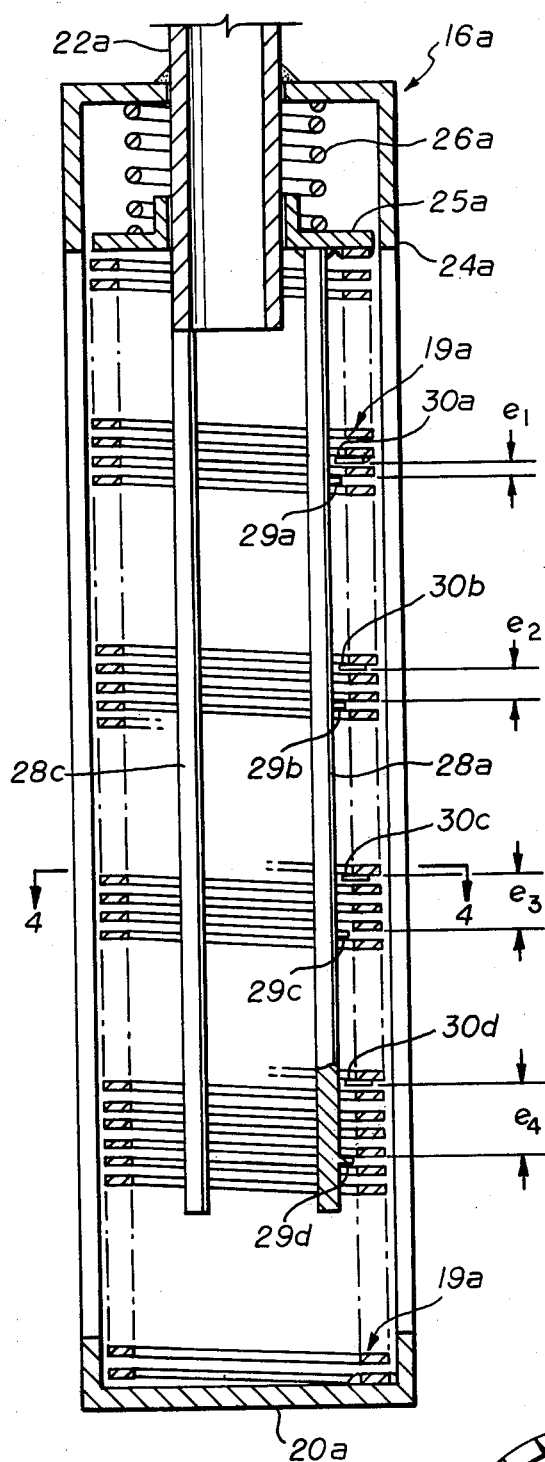
FIG. 3 is an enlarged schematic longitudinal sectional view of a second modification of the new sand screen.

FIGS. 2 and 3 illustrate schematic sectional views of two preferred modifications of the new self-cleaning helical spring filter of screen assemblies 16 and 16a, respectively.

While various shapes may be utilized for the wire or bar stock for forming the helical spring 19, per se, rectangular cross-sectioned bar stock of a suitable alloy is preferred in this case.

Figure 4:
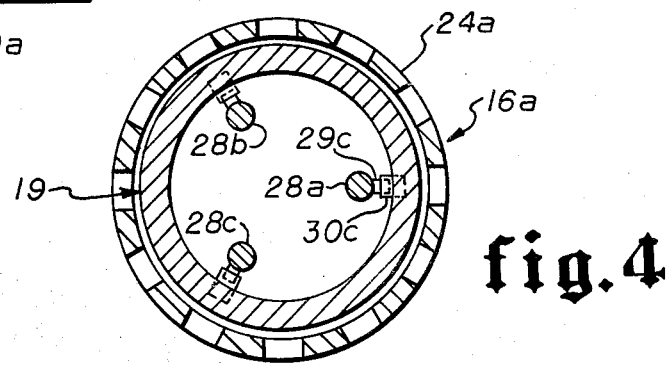
FIG. 4 is a section at 4—4 on FIG. 3.

FIG. 2 illustrates helical spring screen assembly 16 having a base 20 connected to a packer 21, FIG. 1, fixed in the well at the level of the unconsolidated petroliferous sand strata 17. A production tube 22 protrudes down through a closed ended cylinder 23, FIG. 2, into the helical spring screen 16 and carries the sand-free liquid, as crude oil for example, to the surface after having passed through and having been filtered by the helical spring screen 19. The closed ended cylinder 23 is held rigidly spaced from the assembly base 21 with a plurality of rigid bars 24. While the rigid support means between the cylinder and base may be any suitable perforated wall or the like, the three bars 28a, 28b and 28c, FIG. 4 are preferred for forming the open housing.

Helical spring screen 19 is positioned between and fixedly secured to base 20 and an annular piston 25 slideably mounted on the production tube 22 and in the cylinder 23.

A short compression spring 26, FIG. 2, is squeezed or positioned between the closed end or top of the cylinder 23 and the piston 25 so that with the spring in balance or neutral position, it maintains the helical spring screen 19 compressed by the exact amount to space its coils apart by the precise predetermined distance to filter the sand from the oil as the sand-bearing oil flows from the unconsolidated petroliferous sand strata 17 into the helical spring screen, where the filtered oil then is pumped up through the production tube 22 to the surface.

Discharge pipe 18, FIG. 1, also includes a conventional hydraulic surge or pulse generator 27 for generating a hydraulic surge or pulse back down the production tube 22 and into the helical spring screen 19.

In operation of the helical spring filter or screen assembly 16, FIG. 2, when a gradual build up of resistance to oil flow through the screen is detected, that indicates that the helical spring screen 19 is becoming clogged with sand. One or more hydraulic pulses are then generated in the production tube by pulse generator 27 which thus reaches the helical screen 19 to suddenly and instantly force the piston 25 up to compress the small spring 26 and stretch the helical screen 19 to separate its coils. Simultaneously, outward rushing liquid flow occurs, forcing all loose sand grains into the region surrounding the well. Subsequent attenuation of the hydraulic pressure pulse and drop of the piston 25 by expanding action of the small compression spring 26 forces the adjacent screen coils together hard in contact with each other for further loosening of adhered sand grains. The above cycle may be repeated sufficiently until the screen is cleaned out as indicated by reduced resistance to flow detected at the surface. This would be indicated by a reduction in the peak pressure associated with the hydraulic pulses.

Various piston pumps or hydraulic pulse generators, such as but not limited to, an electromagnetically powered plunger 27 may be utilized for generating the hydraulic pulse down the closed-system well casing or production tube 22 and into the screen assembly 16. Frequency of the pulses is chosen to optimize hydraulic power transmission according to the properties of the screen and wellbore depth.

MODIFICATION OF FIGS. 3 & 4

A modified helical spring screen assembly 16a is disclosed in FIG. 3, when a particularly long helical spring 19a is utilitized. When using long helical springs, if only the upper end were stretched upwardly, the upper coils would flex the greatest amount producing an unequal spacing between all of the coils for the complete length of the helical spring.

Accordingly, the extra long helical spring screen assembly 16a of FIG. 3 has further novel features for ensuring equal spacing of all coils of the elongated helical spring screen 19a as it is flexed, i.e., as it is expanded and contracted from a neutral position of screening or filtering liquid from the adjacent formation.

Similar to the first modification 16 of FIG. 2, the helical spring screen 19a of FIG. 3 is fixedly secured at its ends to base plate 20a and piston 25a for compressing and storing energy in small spring 26a. Additional novel features comprise three lifter rods 28a, 28b, and 28c rigidely connected, as by welding, to piston 25a and extending down internally of the helical spring screen to near the bottom, but not within reach of it with maximum contraction of the helical spring. Four tabs 29a, 29b, 29c, and 29d, FIG. 3, for example, are equally spaced along and secured to each of the lifter rods, only those on rod 28a being illustrated. Also, a set of four lugs 30a, 30b, 30c, and 30d, FIG. 3, is fixedly secured, as by welding, to four corresponding coils opposite each set of tabs. While this number of four is merely exemplary for the illustrated helical spring screen, any suitable number may be used, depending on the length of the spring and size of the coils. Lugs (not shown) are likewise provided for the corresponding tabs on the other lifter rods (not shown).

The gaps "e" between each tab 29 and its respective lug 30 is calculated or shown below for ensuring substantially equal spacing between the coils for the full length of the spring for the full lift stroke of the piston 25a at the top.

$$e_1 = 1/5\Delta$$
$$e_2 = 2/5\Delta$$
$$e_3 = 3/5\Delta$$
$$e_4 = 4/5\Delta$$
$$e_i = i/n$$

Where:
$\Delta$ = total upward movement of piston or top coils of spring.
$e_1$ = gap or clearance between tab 29a and lug 30a comprising the first pair.
$e_2$, $e_3$ or $e_4$ = gaps for the remaining pairs.
$e_i$ = gap or clearance between a particular pair of tabs and lugs.
n = number of equal intervals between tabs.
i = number of pairs of tabs and lugs or n−1, beginning at the top.

FIG. 4, a section at 4—4 on FIG. 3, illustrates the helical spring screen 19a inside the open housing 24a.

In operation of the modified helical spring filter or screen assembly 16a, FIGS. 3 and 4, upon the filter becoming clogged, a hydraulic pulse is generated by pulse generator 27, FIG. 1, for passing down the production tube into the middle of the helical spring screen assembly. Instantly with occurrence of the high pressure hydraulic pulse, the piston 25a is forced upwardly rapidly to raise the lifter rods 28a–28d, FIG. 4, upwardly by at least a distance $\Delta$ in the example above. The distance $\Delta$ is exaggerated in FIG. 3, as distance $e_4$ represents 4/5 $\Delta$. With such a long helical spring, only the upper one fifth portion of the spring, for example, would be stretched and only the coils therein that portion would separate the most with uneven and unequal separation over the entire length of the helical spring screen.

Accordingly, in the modification of FIG. 3, after the piston has moved upwardly through one fifth the distance or a distance of $e_1$ of the total distance $\Delta$ in the above example, and the piston has lifted the first coil by a distance of $e_1$, then the lifter bar tab 29a contacts lug 30a for lifting the top coil of the second one fifth section of the helical spring. While not illustrated, lifter bars 28b and 28c likewise have tabs thereon for contacting their corresponding spring lugs similar to tabs 29a–29d and lugs 30a–30d. Upon the piston and lifter bar having traveled upwardly by a distance of two fifths the total distance $\Delta$ or a distance of the gap $e_2$, tab 29b contacts lug 30b for raising the top coils of the third fifth of the total distance $\Delta$ to be traveled. Then tab 29c contacts lug 30c to separate the coils of the fourth fifth of the helical spring screen. Finally upon the piston and lifter bars beginning the final one fifth of the lift, tab 29d contacts lug 30d to separate the coils of the lowest and last section of the helical spring screen. Accordingly, upon reaching at least a distance $\Delta$ of upward travel of the piston and lifter bars where the spring 26a has become compressed and the upward force of the hydraulic pulse has attenuated, all coils of the long helical spring screen or filter have separated by substantially an equal amount, the maximum amount of liquid is passing between the coils for cleaning thereof.

The liquid continues to exit rapidly between the coils as the small spring forces the piston 25a and helical spring screen 19a downwardly to contract to closed or collapsed position. As all coils thus suddenly contact each other with almost an equal force as that expanding them, most remaining foreign material, as sand, is dislodged from the surfaces of the coils and removed upon subsequent expanding and flow of liquid between the coils. The above cycle may be repeated, if so desired, until the screen is cleaned and the resistance to flow therethrough is reduced. This would be indicated by a reduction in the peak pressure associated with the hydraulic pulses. Again, frequency of the pulses is chosen to optimize hydraulic power transmission according to the properties of the screen and wellbore depth.

Obviously other methods may be utilized for cleaning or for forming or assembling the embodiments of either FIG. 2 or FIG. 3 than those listed above, depending on the particular amount of complexity that can be tolerated in a filter.

Accordingly, it will be seen that while only two modifications have been disclosed, both will operate in a manner which meets each of the objects set forth hereinbefore.

While only two methods for filtering and two methods for forming a filter of the invention have been disclosed, it will be evident that various other methods and modifications are possible in the arrangement and construction of the disclosed two helical spring screen assemblies without departing from the scope of the invention and it is accordingly desired to comprehend within the purview of this invention such modifications as may be considered to fall within the scope of the appended claims.

We claim:

1. A method for assembling a helical spring screen assembly for use on a production tube for producing sand-free liquid, the production tube having means for generating a pulse therein comprising the steps of,
   (a) forming a closed ended cylinder with an opening in the closed end for the production tube to extend through,
   (b) slideably mounting an annular piston in the cylinder for sliding movement around the production tube from a neutral position,
   (c) securing a housing to the cylinder with a base at a predetermined fixed distance from the piston neutral position, and
   (d) fixedly securing the opposite ends of a helical spring screen between the base and the annular piston, respectively, whereby upon generation of a hydraulic pulse in the helical spring screen, the helical spring screen is expanded and the coils thereof washed clean.

2. A method as recited in claim 1 wherein the second step (b) may include further,
   (a) mounting a short spring between the piston and the cylinder closed end whereby upon expansion of the helical spring screen, the annular piston is moved due to the pulse to compress the short spring so that upon attenuation of the pulse, the expanding short spring collapses the helical spring screem to further loosen adhered sand grains between the coils thereof for removal upon subsequent spreading of the coils.

3. A method as recited in claim 1 wherein the third step (c) may include further,
   (a) fixedly securing a plurality of rigid bars for forming the housing around the helical spring screen between the cylinder and the base of the assembly for maintaining the assembly base at the predetermined fixed distance from the piston neutral position.

4. A method as recited in claim 1 wherein the last step (d) includes further,
   (a) fixedly securing one end of the helical spring screen to the housing base, and
   (b) fixedly securing the other end of the helical spring screen to the annular piston as the sole connections on the helical spring screen for pulling on and expanding the helical spring screen upon occurrence of a hydraulic pulse.

5. A method as recited in claim 1 wherein the last step (d) includes further,
   (a) fixedly attaching one end of a lifter bar to the annular piston,
   (b) fixedly attaching spaced apart tabs on the lifter bar, and
   (c) fixedly attaching spaced apart lugs on the helical spring screen coils for being contacted by the corresponding tabs for evenly expanding the helical spring screen along its full length from the base upon arrival of the hydraulic pulse for equal distribution of spacing between the coils of a particularly elongated helical spring screen.

6. A method for assembling a helical spring screen assembly for producing sand-free liquid when lowered in a well comprising the steps of,
   (a) forming an open housing with a piston and cylinder on one end and a base on the other end spaced a predetermined distance from the piston when in a neutral position, and
   (b) securing the opposite ends of a helical spring screen of a predetermined length to the piston and the housing base whereby upon generation of a hydraulic pulse in the helical spring screen, the coils of the helical spring screen are expanded and separated for cleaning thereof.

7. A self-cleaning sand screen assembly for producing sand-free liquid from a production tube extending down into the assembly when lowered into a well comprising,
   (a) helical spring screen means mounted in a housing between a base in one end of the housing and piston means in a cylinder in the other end of the housing, the production tube protruding down into the cylinder,
   (b) second spring means for maintaining the piston means at a neutral position where a predetermined spacing is provided between said helical spring screen means coils for filtering the inflowing liquid,
   (c) means for generation a high pressure hydraulic pulse in the liquid in the helical spring screen means, and
   (d) said piston means being responsive to said pulse generator means for expanding said helical spring screen means and for simultaneously forcing high pressure liquid between the coils of said expanding helical spring screen means for cleaning thereof.

8. A self-cleaning helical spring screen assembly for producing sand-free liquid from a production tube extending down into the top of the assembly when lowered in a well comprising, (a) an open housing means comprising a closed ended cylinder having a piston means therein forming one end of the housing means with a production tube extending therein and a base forming the other end of the housing means spaced at a predetermined distance from a neutral position of the piston, (b) helical spring screen means mounted in the housing means between said piston means and the housing base for being expanded by a hydraulic pulse in the helical spring screen means for separating the spring coils for cleaning thereof by expulsion of the liquid between the expanded coils.

9. A self-cleaning sand screen assembly as recited in claim 8 wherein, (a) a second spring means being positioned between the closed end of said closed ended cylinder and said piston in its neutral position for spacing all coils of said helical spring screen at a predetermined distance for filtering sand from the liquid in the well for producing sand-free liquid through the production tube.

10. A self-cleaning sand screen assembly as recited in claim 9 wherein after the hydraulic pulse has attenuated and said second spring means begins to expand, (a) said piston means being responsive to said expanding second spring means rebound stroke for compressing said helical spring screen means for forcing all coils together for forcing loose any sand grains therebetween for removal upon subsequent spreading of the coils.

11. A self-cleaning sand screen assembly as recited in claim 8 wherein, (a) said housing means comprises rigid bars connected between said base and said closed ended cylinder around the production tube for forming said open housing means for housing said helical spring screen means.

12. A self-cleaning sand screen assembly as recited in claim 8 comprising further, (a) hydraulic pulse generating means for said production tube for generating said hydraulic pulse, and (b) said piston means is formed annular shaped for being slideable in said cylinder around said production tube lower end for both expanding said helical spring screen means responsive to said hydraulic pulse generating means and for contracting said helical spring screen means responsive to attenuation of said hydraulic pulse for thorough cleaning of the coils.

13. A self-cleaning sand screen assembly as recited in claim 8 comprising further, (a) connecting means between said piston andone end of said helical spring screen means, and (b) said connecting means being the sole connection between said piston and the helical spring screen for expanding the helical spring screen coils for being cleaned.

14. A self-cleaning sand screen assembly as recited in claim 8 comprising further, (a) lifter bar means connected to said piston, (b) equally spaced apart tabs for said lifter bar means, (c) precisely spaced apart lugs for said helical spring screen means upon occurrence of a hydraulic pulse for ensuring equal spacing between said coils of said helical spring screen means upon full expansion for equal cleaning action on all coils.

* * * * *